United States Patent [19]
Mendelson et al.

[11] Patent Number: 5,897,407
[45] Date of Patent: *Apr. 27, 1999

[54] IMPELLER

[76] Inventors: Harold Mendelson; Mildred Mendelson, both of Pound Ridge, Conn.; Arthur L. Forrest, Chatham, N.J.; John J. Dvorak, Monroe, Conn.

[21] Appl. No.: 08/859,958

[22] Filed: May 21, 1997

Related U.S. Application Data

[60] Provisional application No. 60/015,853, May 24, 1996.

[51] Int. Cl.[6] ................................................. B63H 1/14
[52] U.S. Cl. ........................................ 440/49; 416/241 R
[58] Field of Search ........................... 416/219 R, 241 R; 440/49, 83; 428/660, 668; 419/49

[56] References Cited

U.S. PATENT DOCUMENTS

| | | | |
|---|---|---|---|
| 3,598,080 | 8/1971 | Shields | 440/49 |
| 3,787,223 | 1/1974 | Reedy | 117/69 |
| 4,433,005 | 2/1984 | Manty et al. | 416/241 R |
| 4,772,450 | 9/1988 | Friedman | 419/49 |
| 5,201,679 | 4/1993 | Velte et al. | 440/83 |
| 5,620,307 | 4/1997 | Mannava et al. | 416/241 R |

*Primary Examiner*—Stephen Avila
*Attorney, Agent, or Firm*—Evelyn M. Sommer

[57] ABSTRACT

Disclosed is an impeller made from titanium or a titanium alloy. Desirably, the titanium or titanium alloy is cast into the impeller.

17 Claims, 5 Drawing Sheets

IMPELLER

This application is a continuation-in-part of U.S. Provisional Patent Application Serial No. 60/015,853 filed May 24, 1996, which is hereby incorporated by reference.

BACKGROUND OF THE INVENTION

This invention relates to marine propulsion, and more particularly to an improved propeller or impeller.

Conventionally, impellers have been constructed of stainless steel. In order to obtain the necessary strength and ruggedness these impellers have relatively thick blades, varying from thick at the hub to thin at the edge and are relatively heavy. Stainless steel impellers typically weigh from about 3 to about 60 pounds. To increase speed, impeller manufacturers have tried using lighter stainless steel blades. Nonetheless, the impellers remain relatively heavy.

Since the commercial introduction of titanium and titanium alloys in the early 1950's, these materials rapidly became a staple material for components used in the aerospace, energy, and chemical industries. The combination of a high strength-to-weight ratio, excellent mechanical properties, and corrosion resistance makes titanium the best material for many critical applications.

However, titanium components are expensive and the cost of such components has limited the use of titanium to applications that justify the high cost of this material. The relatively high cost of titanium results from the high cost of separating the pure metal from its ores, intrinsic raw material cost of titanium and its fabricating costs.

OBJECTS AND SUMMARY OF THE INVENTION

The objects of the invention include a novel impeller having a reduced weight while retaining the strength of conventional impellers.

Another feature of the present invention is to provide an impeller of greater strength than that of stainless steel impellers.

A further object of the present invention is to provide a novel impeller that has a substantial immunity to corrosion.

The invention also relates to the material and process of fabricating impellers from titanium metal and its alloys. Specifically, the invention relates to making impellers by casting, hot or cold stamping, forging or fabricating titanium (and titanium alloys) into superior impellers in a process where the metal is protected from contamination by reacting with other elements at elevated temperatures, particularly gases such as oxygen, nitrogen and hydrogen.

Other objects and features of the invention will be in part apparent and in part pointed out hereinafter.

The invention accordingly comprises the construction, and method hereinafter described, the scope of the invention being indicated in the claims.

BRIEF DESCRIPTION OF THE DRAWINGS

In the accompanying drawings.

Corresponding reference characters indicate corresponding parts throughout the several views of the drawings.

DESCRIPTION OF THE PREFERRED EMBODIMENTS

Figure 1:
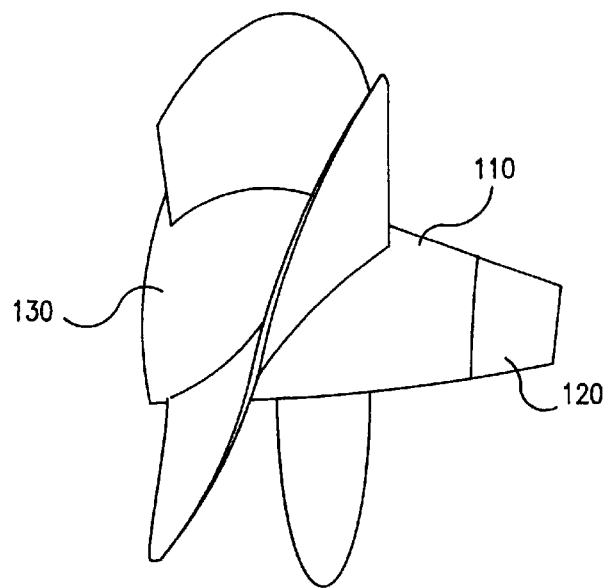
FIG. 1 is a side view of an impeller of the present invention.
Figure 2:
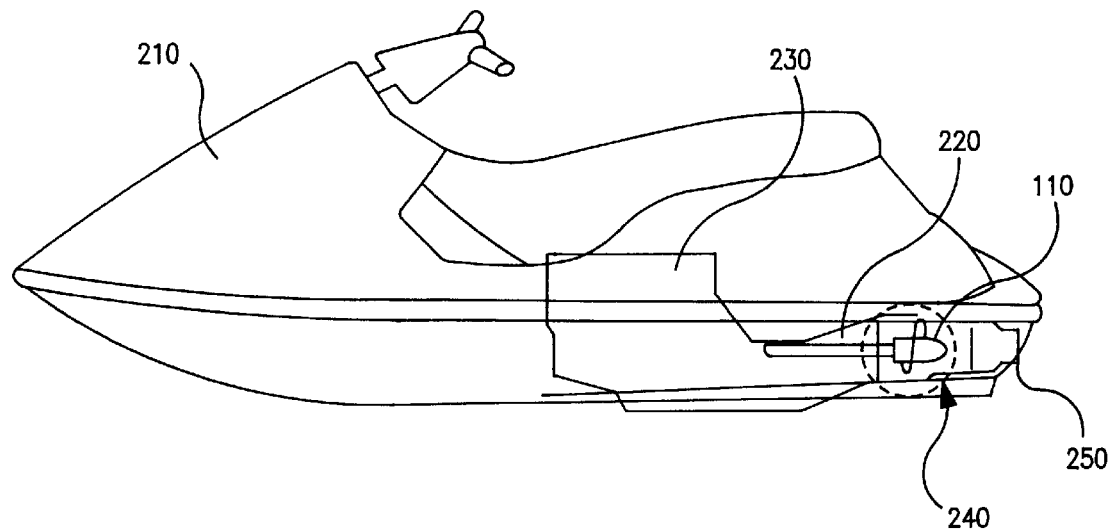
FIG. 2 is a plan view of an impeller, of the type shown in FIG. 1, driven marine craft.

A marine craft incorporating the present invention is generally indicated by the reference number 210 in FIG. 2. In FIG. 1, the main body, 130, of impeller, 110, is secured by an endcap 120. Typically, end cap 120 is made of any conventional plastic that is compatible with an extended exposure to a marine environment.

Impeller main body 130 can be of any conventional design including blade pitch and includes a conventional means of being secured to drive shaft 220 which is shown in FIG. 2. Such conventional securing means include a spline or hex slot.

Turning to FIG. 2, conventional marine craft 210 has an engine 230 that rotates a drive shaft 220. Drive shaft 220 is part of a jet pump assembly 240 and impeller 110 is secured to said drive shaft 220 so as to expel water through discharge nozzle 250.

The blades of the impellers of the present invention are lighter, and therefore accelerate faster, than the impellers heretofore available. Moreover, in some embodiments, the blades of the impellers of the present invention can be narrower that impellers heretofore available and still retain the necessary strength. Furthermore, titanium has a higher strength to weight ratio than do any of the other alloys or metals that have been used to make impellers heretofore.

Titanium impellers can be formed using net shape or near-net shape technologies. These titanium net shape technologies include powder metallurgy (PM), super plastic forming, stamping precision forging, and precision casting. Alternatively, the inventive impellers can be made by titanium castings in the absence of gases that react with titanium at the elevated temperatures required to cast titanium, such as oxygen, nitrogen and hydrogen, or by hot or cold stamping, forging, drawing, cold drawing, extruding or fabrication. Casting is the preferred means of making the impellers of the present invention.

The particular advantage of using titanium or a titanium alloy in the inventive impeller is weight reduction accompanied by a combination of reduced modulus of elasticity, increased yield strength, tensile strength, toughness and impact resistance. In particular, the modulus of titanium is about half of that of steel while being about 3 times stronger, and a 50% higher modulus, than aluminum.

Figure 6:
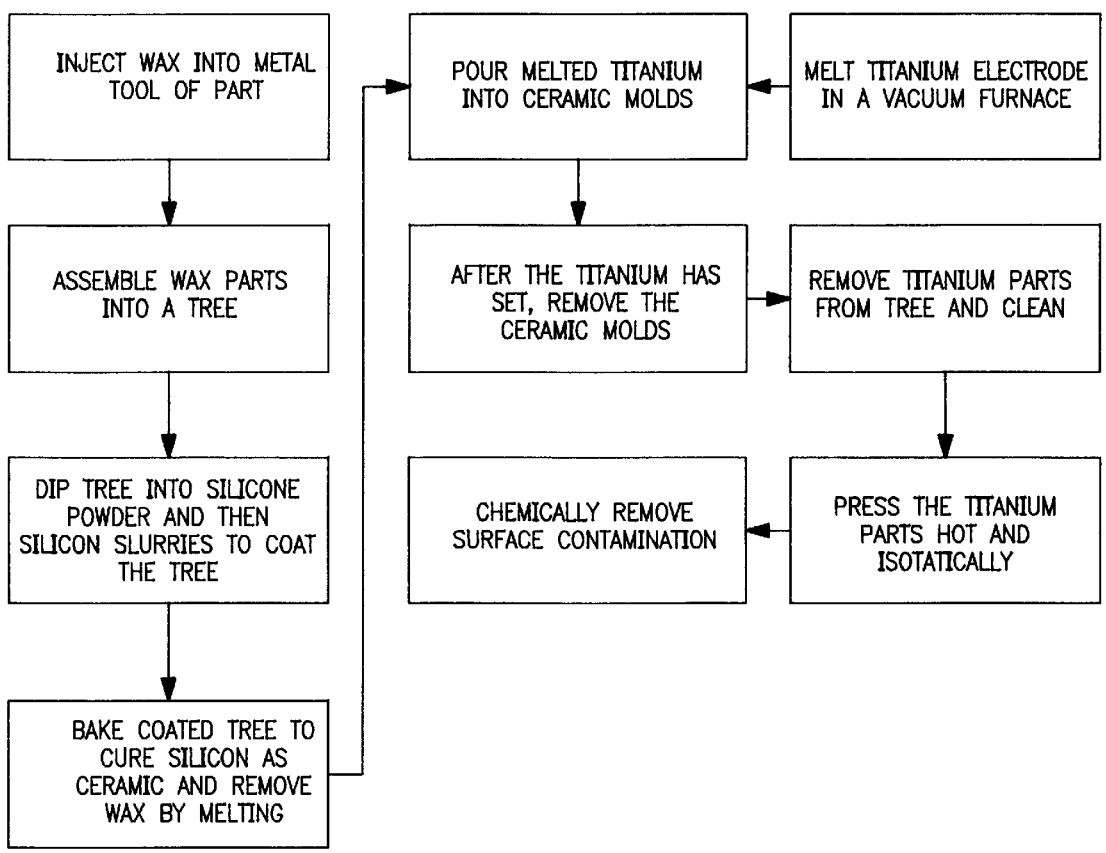
FIG. 6 is a schematic diagrammatic flow chart illustrating still another embodiment of how the impellers of the present invention can be made.

A preferred embodiment of the present processing invention comprises an improved impeller and is shown in FIG. 6. This impeller can be constructed of titanium, or a titanium alloy, in the following manufacturing two part process (mold construction and casting):

A] Mold Construction a) wax is injected into a metal tool of the impeller;

b) the wax injections are assembled into a tree;

c) the tree is dipped into a refractory powder, such as silicone, and then into refractory slurries to coat the tree; and d) the coated tree is baked to cure the binder and form a ceramic mold form which the wax is removed by melting.

B] Casting a) titanium electrode is melted in a vacuum furnace;

b) the molten titanium is poured into the ceramic molds;

c) once the titanium has solidified, the molds are removed;

d) the titanium parts are removed from the tree and cleaned;

e) the titanium parts are hot, isotatically pressed to create metal flow and close internal voids and regions of low density; and d) surface contamination is chemically removed.

Figure 3:
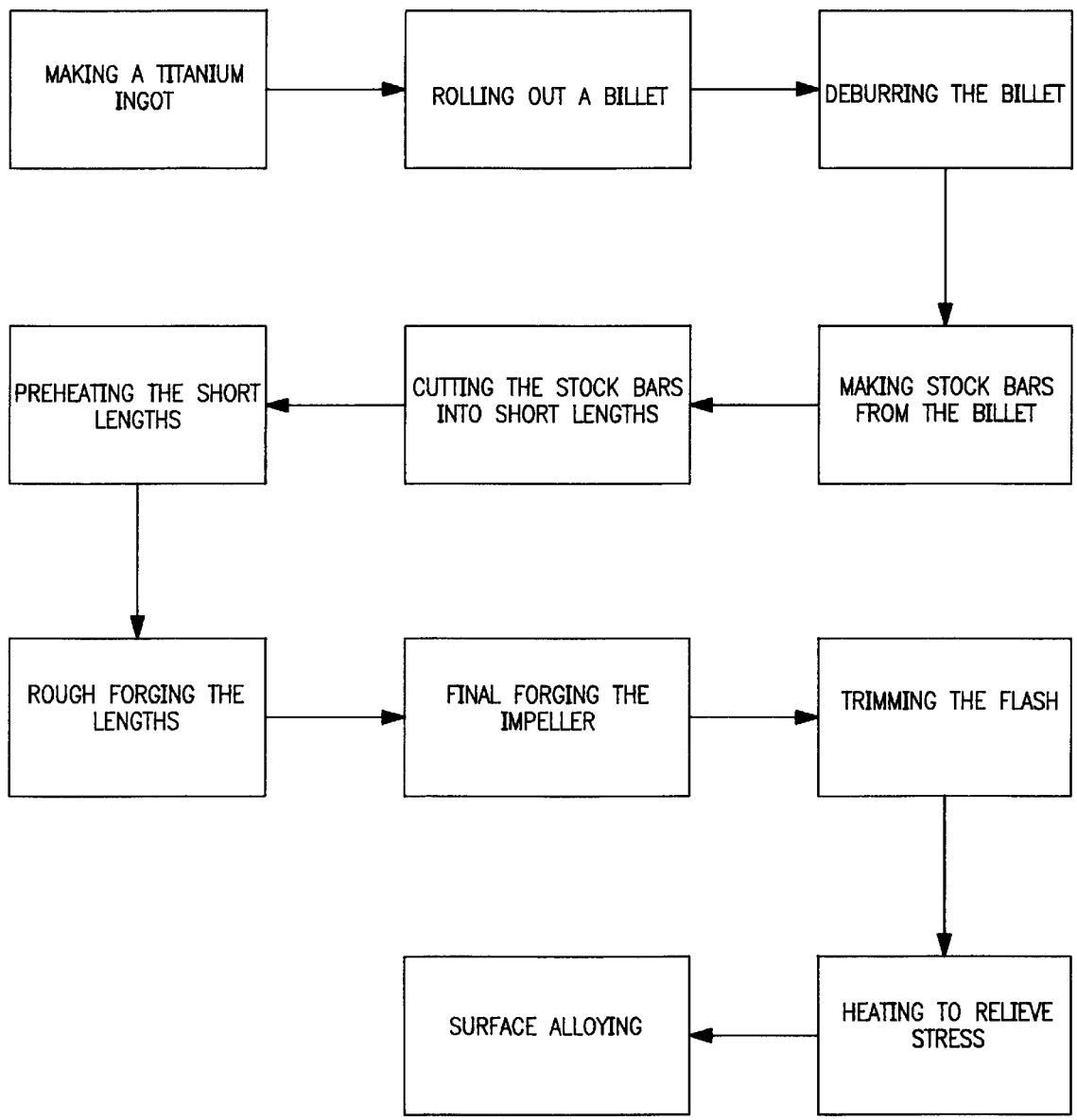
FIG. 3 is a schematic diagrammatic flow chart illustrating one embodiment of how the impellers of the present invention can be made.

FIG. 3 shows an alternative processing invention for making the impeller of the present invention. This impeller can be constructed of titanium, or a titanium alloy, in the following manufacturing process:

a) making a titanium ingot;

b) rolling (or casting) said titanium ingot into a billet;

c) deburring the billet;

d) making stock bars from the billet;

e) cutting the stock bars into short lengths;

f) preheating the short lengths;

g) rough forging the lengths;

h) final forging the impellers;

i) trimming the flash;

j) heating the impeller shape; and k) surface alloying said forged shape.

Figure 4:
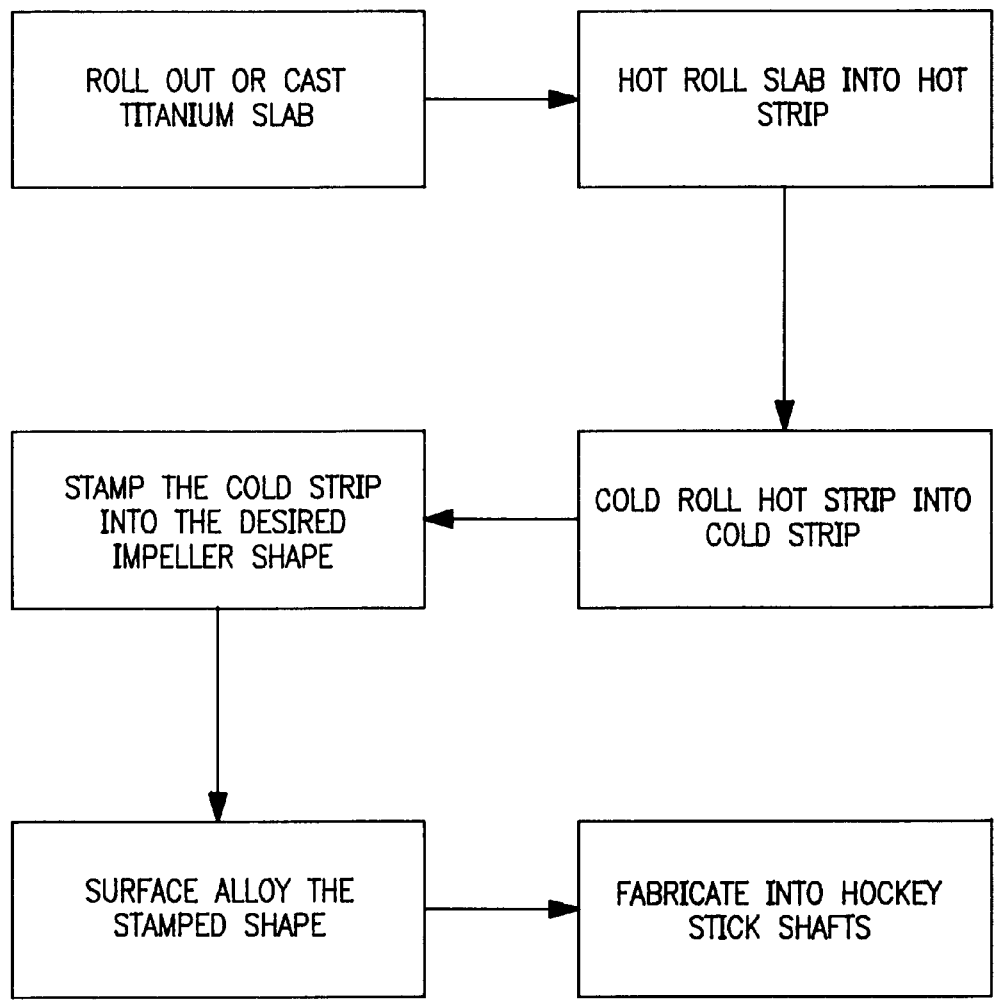
FIG. 4 is a schematic diagrammatic flow chart illustrating another embodiment of how the impellers of the present invention can be made.

FIG. 4 shows a preferred alternate means for making the improved impeller of the present invention. This impeller can be constructed of titanium, or a titanium alloy, in the following manufacturing process:

a) rolling (or casting) titanium into a slab;

b) hot rolling the slab into a hot strip;

c) cold rolling the slab into a cold strip;

d) stamping said cold strip into an impeller shape;

e) surface alloying said shape; and f) fabricating said shape into a finished impeller.

Figure 5:
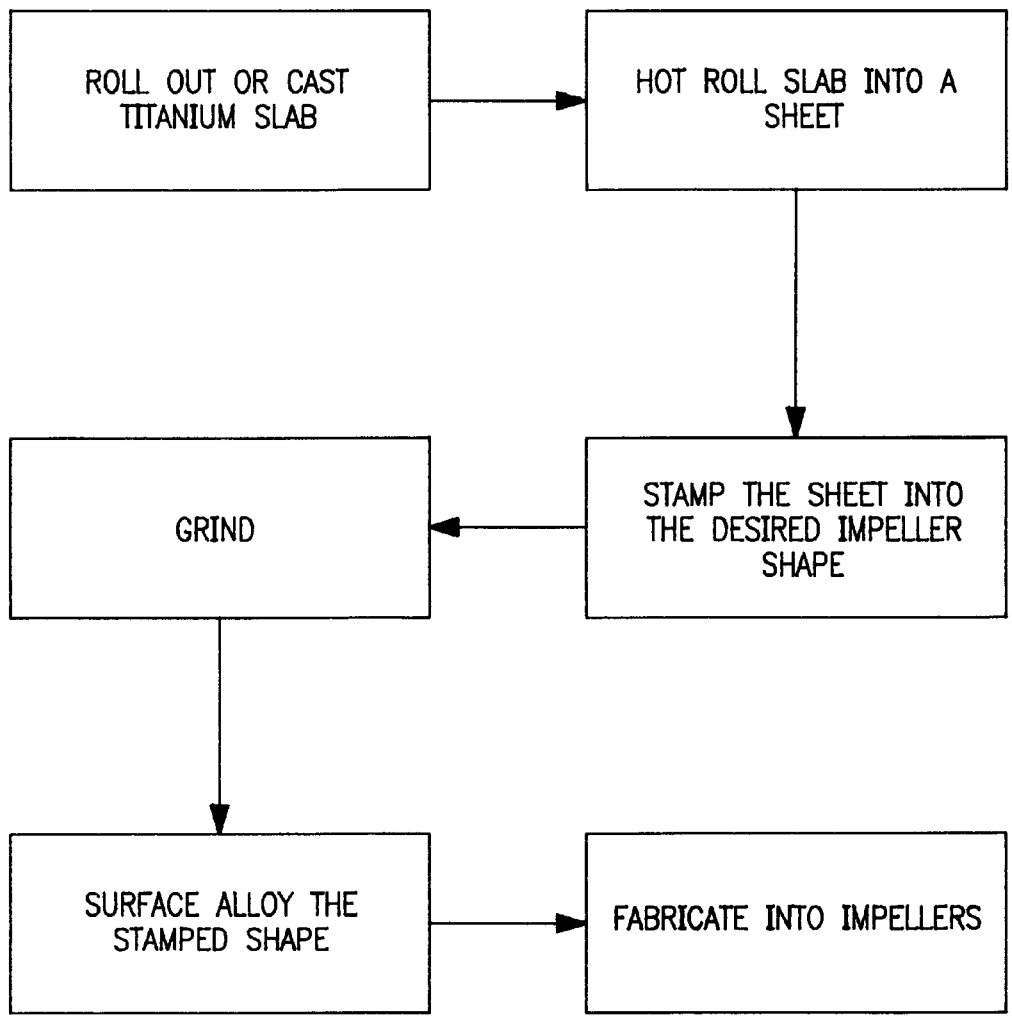
FIG. 5 is a schematic diagrammatic flow chart illustrating yet another embodiment of how the impellers of the present invention can be made.

Yet another preferred alternate means for making the improved impeller of the present invention is shown in FIG. 5. This impeller can be constructed of titanium, or a titanium alloy, in the following manufacturing process:

a) rolling (or casting) titanium into a slab;

b) hot rolling the slab into a sheet;

c) stamping said rolled sheet into an impeller shape;

d) grinding the stamped blade shape;

e) surface alloying said shape; and f) fabricating said shape into a finished impeller.

The process for making impellers of the present invention desirably uses titanium, or alternatively, alloyed titanium. Typically, unalloyed titanium comprises at least about 98.9 percent titanium. A wide range of titanium alloys can be used in the practice of the present invention such as ASTM grades 6–12 as well as commercially pure titanium such as grades 1 through 4. Desirably the titanium alloy is at least as strong as grade 5 titanium alloy. Additionally, titanium β-alloys, such as 15-3-3-3, can be used in the practice of the present invention. The use of such alloys can increase the tensile properties of the titanium. Moreover, at least some of these alloys are easier to form into the impeller of the present invention than pure, and commercially pure, titanium. Some of these alloys have a strength advantage over pure, and commercially pure, titanium when made into the impeller of the present invention. Thus, the impeller of the present invention typically is at least about 66%, by weight, titanium.

One means of surface alloying the impellers of the present invention is through the use of a conventional nitriding step.

Typically, the titanium used in the process of the present invention for making impellers begins with the casting of slabs or ingots of titanium, or a titanium alloy. Such ingots can be of any size that can be subsequently worked. However, ingots of about 12 in. (30.5 cm.)×44 in. (112 cm.)×150 in (380 cm.) are usually chosen.

These ingots can then be worked down to a bar or billet size and then cast into an impeller shape using any conventional titanium casting technology.

Alternatively, the titanium, or alloy of titanium, ingot is typically hot rolled into a strip, either directly or after first making an intermediate slab with an approximately 3 in. (7.6 cm) thickness. In the process of the present invention for making impellers, the hot strip is then processed to make a cold strip of titanium of finished thickness gauge. The cold strip is then stamped into the desired shape. The impellers are fabricated and, as a last optional step, the fabricated impeller is typically surfaced alloyed to improve the properties of the impeller.

Other conventional methods of making products from titanium and titanium alloys can be used. For example, waterjet, laser cutting, etc. can all be used to make the inventive impellers. Other processes that are applicable include forging the titanium from cast slabs or ingots of titanium, or an alloy of titanium. Such ingots can be of any size that can be subsequently worked. However, ingots of about 12 in. (30.5 cm.)×44 in. (112 cm.)×150 in (380 cm.) are usually chosen.

In a forging process, the titanium, or an alloy of titanium, ingot is typically hot rolled into about a ½ in. (1.25 cm.) to 4 in. (10 cm) thick sheet, or plate, either directly or after first making an intermediate bloom with an approximately 5 in. (12.5 cm) thickness. The plate is then processed to make titanium bars with an approximately about a ½ in. (1.25 cm.) to 4 in. (10 cm) square cross section. While the plate can be made into bars by any conventional means, rolling and shearing are desirable means of converting the plate into titanium bars for used in the process of the present invention for making impellers. It is anticipated that by rolling or shearing the plates into bars one or more of the steps of pickling, annealing and grinding can be eliminated.

In one embodiment, the titanium bar used to make the impellers is deburred desirably to a round, smooth edge, at this point in the process. The bars can also be straightened at this point in the process if desired. The deburring and straightening steps remove irregular surface patterns and rounds corners of the bar which is believed to prevent cracks or tears forming during the subsequent processing of the titanium.

In a typical forging embodiment of the process for making impellers of the present invention, the titanium bars are first cut into stock bars of about 20 ft (6.1 m.) lengths. Subsequently, these stock bars are cut into lengths sufficiently large to fill the forging dies with, desirably, as little excess as possible. Typically these lengths are between about 2 and 8 inches (5 and 20 cm).

Precut titanium bars made by other forging processes can be substituted for the above-described bars.

Desirably, these precut lengths of a titanium bar are preheated to at least about 750 F. (400 C.), preferredly to between about 800 and 1500 F. (425 and 815 C.), and more preferredly to between about 800 and 1100 F. (425 and 600 C.). However, it is important that the titanium bars are kept below the melting temperature of the titanium throughout the process of the present invention. Desirably, the titanium bars are kept below about 2000 F. (100 C.) throughout the process of the present invention, and more desirably below about 1800 F. (980 C.) throughout the process of the present invention. Among things, this control of the temperature of the titanium is believed to avoid oxidation and other reactions of the titanium with gases in its environment.

The precut lengths of titanium which desirably have been heated are then forged. In a preferred embodiment of the present inventive method of making titanium impellers, the precut lengths are bent in a first forging step into curved shape. Desirably, the curved shape approximates the shape of the impeller into which the titanium is to be formed. This first forging step typically takes place at a temperature between about 1400 and 2150 F. (760 and 1180 C.), and desirably between about 1500 and 1700 F. (815 and 925 C.). This first forging step can be done using conventional power brake forming or stretch forming techniques.

The impeller is formed in an impeller die which is desirably made from hot work tool steel. The precut titanium, preferably the bent precut titanium is placed on a die. In one embodiment of the process for making impellers of the present invention, the die with the precut titanium is placed in a gas forge, and using a hammer of about 500 to 5000 lbs. (230 to 2270 kilo), and preferably about 1200 to 1500 lb. (545 to 680 kilo), to apply a pressure to the titanium sufficient to shaped it into the desired impeller shape. The titanium in this process is also typically between about 1400 and 2150 F. (760 and 1180 C.), and desirably between about 1500 and 1700 F. (815 and 925 C.).

In an alternative embodiment of the present invention, the impeller is shaped in a press forge operating at about 500 tons to 1500 tons, and desirably between about 600 and 800 tons.

Desirably, the impeller dies are heated before the precut titanium blank is placed in the dies.

After the shaped titanium is removed from the molding die, the flash is removed in a conventional fashion such as by the use of a trimming die or by machining.

If desired, the impeller can be reheated at this time. For instance, the impeller can be reheated at this time to relieve stress, or to ensure that the titanium is fully annealed. Any such reheating should be done between about 1000 and 1700 F. (538 and 925 C.), desirably between about 1000 and 1300 F. (538 and 700 C.), and more desirably between about 1000 and 1100 F. (538 and 600 C.) for stress relief and between about 1300 and 1400 F. (700 and 760 C.) to anneal. Typically, if the reheating is to relieve stress, the reheating is for at least about 30 minutes, thereafter, the impellers are allowed to air cool. When the reheating is to fully anneal the impeller, the reheating is done at about 1400 F. (760 C.) for between about 30 and 120 minutes, after which the impellers are allowed to air cool.

In an alternative embodiment in which the titanium is forged into impellers at temperatures less than about 1200 F. (650 C.), the impeller is desirably annealed after forging.

The process for making impellers of the present invention can be carried out under ambient or other conventional atmospheric conditions found about a forge. In other words, unlike other means of working titanium heretofore known, this inventive process for making impellers out of titanium is believed to not require the exclusion of any of the gases that react rapidly with titanium at elevated temperatures. The ability of the process of the present invention to work with the titanium under substantially any atmospheric composition makes the inventive process easier than those processes heretofore known.

The impellers of the present invention are desirably substantially free of voids. Furthermore the dendritic structure of the titanium is refined over that of the ingot used at the beginning of the process and the impeller typically has a fiber structure that parallels the impeller's shape. This characteristic is also reflected in a directional alignment of the metal grains. Moreover, substantially all of the defects and pores in the initial ingot are removed. Specifically, titanium products made using PM, while useful, contain voids and thus are weaker than a titanium product without such voids.

In another example of a manufacturing process for making the present invention is forging an improved impeller from titanium and titanium alloys. In such a forging process, the titanium is preferredly kept at an elevated temperature by immersing said titanium in a heat bath throughout the intervals in the processing.

The typical impeller of the present invention has a diameter of between about a two (2) and about twenty (20) inches. Desirably, the impeller diameters are between about three (3) and about fourteen (14) inches, and more desirably, between about three (3) and about twelve (12) inches. However, length can vary in accordance with individual preference and need. Some advantages of the inventive titanium impeller are as follows:

1) Significantly lighter than steel;
2) For a given blade width, titanium impellers can be stronger than steel ones;
3) Abrasion resistant;
4) Workability;
5) Fabricability;
6) Has high capacity manufacturing capability without production problems;
7) Less fatigue compared to steel, thus the blade retains its form throughout its life;
8) It is more durable and economical because there is minimal fatigue or breakage;
9) Reduced weight, increased tensile strength, toughness and impact resistance when titanium materials are used to form the impeller;

An impeller of the present invention was prepared by casting in a mold created by using a cast prepared from a wax pattern. See FIG. 6. The cast impeller of the present invention was performance tested against a production stainless steel impeller (a Sea-Doo® 331A impeller). The impeller of the present invention out-preformed the production impeller and included an improved side to side acceleration, an improvement in top speed by 0.5 to 1.0 mph, and a significant improvement in recovery of the pump when operated in choppy waves.

Another cast impeller of the present invention was made from 6–4 titanium and showed similar results.

To improve impeller resistance to fatigue stress, the cast impeller is shot-peened (i.e. cold working the surface of the impeller by metal-shot impingement.

Additional testing on a propeller of the present invention on Tournament Boats (high performance offshore fishing boats). These improvements included a 15% increase in acceleration and a 2–3 mph increase in top speed as compared to comparable stainless steel propellers.

In view of the above, it will be seen that the several objects of the invention are achieved and other advantageous results attained.

While the invention has been illustrated and described as embodied in an improved titanium impeller, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present impeller and propeller invention that others can, by applying current knowledge, readily adapt it for various applications without omitting features that, from the standpoint of prior art, fairly constitute essential characteristics of the generic or specific aspects of this invention. What is claimed as new and desired to be protected by letters patent is set forth in the appended claims.

What is claimed is:

1. An impeller comprising at least 66%, by weight titanium and having a surface alloy layer, wherein said impeller has a metal fiber structure that substantially parallels said impeller's shape.

2. The impeller of claim 1 wherein said impeller has diameter of between 2 and 20 inches.

3. The impeller of claim 2 wherein said impeller is substantially free of voids.

4. An impeller-driven marine craft comprising
   a) an impeller, said impeller being at least about 66% by weight titanium and having a surface alloy layer wherein said impeller has a metal fiber structure that substantially parallels said impeller's shape;
   b) an engine attached to, and capable of driving said impeller, and
   c) said marine craft onto which said engine and impeller are mounted so as to enable said engine and impeller to drive said marine craft.

5. The impeller-driven marine craft of claim 4 further comprising a drive shaft linking said engine to said impeller.

6. The impeller-driven marine craft of claim 5 further comprising a hex slot effective to secure said impeller to said drive shaft.

7. The impeller-driven marine craft of claim 4 wherein said impeller has a diameter of between about 2 and 10 inches.

8. The impeller-driven marine craft of claim 4 further comprising a water discharge nozzle functionally linked to said impeller.

9. A method of making an impeller comprising casting a piece of metal comprising at least about 66% by weight titanium and having a surface alloy layer wherein said impeller has a metal fiber structure that substantially parallels said impeller's shape, into an impeller's shape.

10. The method of making an impeller of claim 9 further comprising nitriding said stamped shape.

11. The method of making an impeller of claim 10 further comprising preparing a lost wax mold for said casting process.

12. The method of making an impeller of claim 10 further comprising preparing a lost wax mold tree.

13. The method of making an impeller of claim 12 further comprising hot isotatic pressing.

14. The method of making an impeller of claim 9 further comprising chemically removing surface contamination from said impeller.

15. The method of making an impeller of claim 9 further comprising shot-peening.

16. A propeller comprising at least 66% by weight titanium and having a surface alloy layer wherein said propeller has a metal fiber structure that substantially parallels said propeller's shape.

17. The propeller of claim 16 wherein said impeller has a diameter of between about 2 and 10 inches.

* * * * *